United States Patent
Lubow

(10) Patent No.: US 7,322,514 B2
(45) Date of Patent: Jan. 29, 2008

(54) METHOD FOR IDENTIFYING AND AUTHENTICATING GOODS USING CODES, BARCODES AND RADIO FREQUENCY IDENTIFICATION

(75) Inventor: Allen Lubow, Brooklyn, NY (US)

(73) Assignee: International Barcode Corporation, New York, NY (US)

( * ) Notice: Subject to any disclaimer, the term of this patent is extended or adjusted under 35 U.S.C. 154(b) by 149 days.

(21) Appl. No.: 11/008,785

(22) Filed: Dec. 8, 2004

(65) Prior Publication Data

US 2005/0199723 A1    Sep. 15, 2005

Related U.S. Application Data

(63) Continuation-in-part of application No. 10/497,636, filed as application No. PCT/US02/38558 on Dec. 2, 2002, now Pat. No. 7,108,186.

(60) Provisional application No. 60/528,046, filed on Dec. 8, 2003, provisional application No. 60/334,570, filed on Nov. 30, 2001.

(51) Int. Cl.
*G06F 17/00* (2006.01)
(52) U.S. Cl. ...................... 235/375; 235/383
(58) Field of Classification Search .......... 235/462.01, 235/492.09, 462.09, 454, 487, 375, 382, 235/383, 385
See application file for complete search history.

(56) References Cited

U.S. PATENT DOCUMENTS

| | | | |
|---|---|---|---|
| 4,590,366 A * | 5/1986 | Rothfjell | ............. 235/494 |
| 4,777,357 A | 10/1988 | Harada et al. | |
| 4,795,281 A | 1/1989 | Ulinski, Sr. et al. | |
| 4,811,408 A * | 3/1989 | Goldman | ............. 382/115 |
| 4,889,367 A * | 12/1989 | Miller | ............. 283/88 |
| 5,235,167 A | 8/1993 | Dvorkis et al. | |
| 5,337,361 A * | 8/1994 | Wang et al. | ............. 380/51 |
| 5,522,623 A | 6/1996 | Soules et al. | |
| 5,563,401 A | 10/1996 | Lemelson | |

(Continued)

FOREIGN PATENT DOCUMENTS

EP    0921675 A2    6/1999

(Continued)

OTHER PUBLICATIONS

International Search Report and Written Opinion mailed Oct. 24, 2005 in corresponding International Application No. PCT/US04/41084.

(Continued)

*Primary Examiner*—Daniel Stcyr
(74) *Attorney, Agent, or Firm*—Davidson Berquist Jackson & Gowdey LLP

(57) ABSTRACT

Methods are described for identifying and authenticating goods. A code or checksum based on information or an image relating to a good is derived and associated with a barcode to include on a label. The label is scanned by a recipient to authenticate the goods. Scanable codes are provided based on an image by distilling an image into its hue components and using a grid to create a pattern. The pattern is readable by a scanner to obtain a code directly, or by consulting a look-up table. The code, barcode, digital barcode or scanable code can be included on a label or tag, such as an RFID tag.

19 Claims, 10 Drawing Sheets

U.S. PATENT DOCUMENTS

| | | |
|---|---|---|
| 5,841,886 A | 11/1998 | Rhoads |
| 5,913,542 A | 6/1999 | Belucci et al. |
| 5,971,587 A * | 10/1999 | Kato et al. ................. 700/115 |
| 6,032,861 A | 3/2000 | Lemelson et al. |
| 6,100,804 A | 8/2000 | Brady et al. |
| 6,318,636 B1 | 11/2001 | Reynolds et al. |
| 6,342,839 B1 | 1/2002 | Curkendall et al. |
| 6,354,494 B1 | 3/2002 | Marcus |
| 6,409,401 B1 | 6/2002 | Petteruti et al. |
| 6,415,978 B1 | 7/2002 | McAllister |
| 6,463,039 B1 | 10/2002 | Ricci et al. |
| 6,494,367 B1 | 12/2002 | Zacharias |
| 6,614,392 B2 | 9/2003 | Howard |
| 6,616,047 B2 | 9/2003 | Catan |
| 6,637,649 B2 | 10/2003 | Walsh |
| 6,646,554 B1 | 11/2003 | Goff et al. |
| 6,685,094 B2 | 2/2004 | Cameron |
| 7,025,269 B2 | 4/2006 | Marshall |
| 2001/0045460 A1 | 11/2001 | Reynolds et al. |
| 2004/0000787 A1 | 1/2004 | Vig et al. |
| 2005/0072846 A1 | 4/2005 | Lubow |
| 2005/0109846 A1 | 5/2005 | Lubow |
| 2005/0161512 A1* | 7/2005 | Jones et al. ................. 235/487 |
| 2005/0161515 A1 | 7/2005 | Lubow |
| 2005/0199723 A1 | 9/2005 | Lubow |

FOREIGN PATENT DOCUMENTS

| | | |
|---|---|---|
| JP | 9-231338 | 9/1997 |
| WO | WO 01/67375 A1 | 9/2001 |
| WO | WO 03/040804 | 5/2003 |
| WO | WO 03/049007 | 6/2003 |

OTHER PUBLICATIONS

International Search Report mailed Apr. 10, 2003 in International Application No. PCT/US02/36371.

International Search Report mailed Apr. 8, 2003 in corresponding International Application No. PCT/US02/38558.

Office Action mailed Dec. 23, 2005 in corresponding European Application No. 02791236.9-2210.

Office Action mailed Jun. 3, 2005 in corresponding European Application No. 02791236.9-2210.

Supplemental European Search Report issued Mar. 8, 2005 in corresponding European Application No. 02791236.9-2210.

International Search Report and Written Opinion mailed Apr. 25, 2006 in corresponding International Application PCT/US2005/029684.

Supplemental European Search Report mailed Jan. 23, 2007, in corresponding European Application No. 02786862.9-2211.

European Search Report mailed May 4, 2007 in European Application No. 02786862.9.

* cited by examiner

METHOD FOR IDENTIFYING AND AUTHENTICATING GOODS USING CODES, BARCODES AND RADIO FREQUENCY IDENTIFICATION

CROSS-REFERENCE TO RELATED APPLICATIONS

This application is a continuation-in-part of and claims the benefit under 35 U.S.C. § 120 from patent application Ser. No. 10/497,636, now U.S. Pat. No. 7,108,186, which is a national stage application of and claims the benefit under U.S.C. § 365(a) from international application no. PCT/US02/38558, filed Dec. 2, 2002, which claims the benefit under 35 U.S.C. § 119(e) from provisional patent application No. 60/334,570, filed Nov. 30, 2001. The contents of the aforementioned applications are incorporated by reference herein in their entirety. The present application also claims the benefit under 35 U.S.C. § 119(e) from provisional patent application No. 60/528,046, filed Dec. 8, 2003, the contents of which is incorporated by reference herein its entirety.

COPYRIGHT AND LEGAL NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

Radio Frequency Data Communications ("RFDC") is a technology that provides wireless interactive and real-time updates of inventory, shipments, or manufacturing applications over local-area and wide-area networked applications. Five frequently cited benefits to using RFDC are increased database accuracy at all times, reduced paperwork, real-time operations, higher productivity, and shorter order response times. RFDC is a communications technology for automatic identification and data capture that is typically used in tracking commercial goods, for example, manufacturing, warehousing, distribution, and logistics management. RFDC is often used with bar code scanning, or Radio Frequency Identification ("RFID") to direct receiving, storage, retrieval, physical inventories, order picking, pickslot replenishment, shipping, tracking returns, labeling, and other applications. RFDC is also used on the factory floor for applications such as work-in-process tracking, and labeling, and in hospitals for tracking pharmaceuticals and medical supplies. On the retail side, radio frequency terminals are increasingly used for price verification, order entry at point of sale, and direct store delivery.

The most common approach to radio frequency implementation uses wireless terminals (either handheld or vehicle-mounted) that include a radio transmitter/receiver, keyboard, LCD display, and usually a bar code scanner. The terminals communicate with the master radio transceiver, also known as base station or wireless gateway, which receives and routes messages from the individual terminals to the radio frequency network controller, and also routes messages such as instructions and exceptions from the host system to the terminals.

Bar code technology is currently over thirty years old with various symbologies in use. The various symbologies include different standards and guidelines for use which optimize various features of the different symbologies for use in different applications. Examples of bar codes include: postal bar code which has tall and short bars, Interleaved Two of Five bar code which is typically used for printing on corrugated cartons, and Reduced Space Symbology ("RSS") bar code, which is a form of two-dimensional bar code.

SUMMARY OF THE INVENTION

Methods are provided for identifying and authenticating goods. In one embodiment, a method is provided for authenticating goods including receiving a code based on information associated with the good. For example, the information is affixed to a label placed on the good. The information may be related to the good, such as information generally used in manufacturing, tracking, shipping, receiving or selling goods, such as product information or product photographs, or other information. The code is received, obtained or generated, for example, using methods including checksum algorithms, sum of known points, or other authentication methods. The code is associated with a barcode, for example, the code is added to the barcode. A label including the information on the barcode and associated code is associated with the good, for example, it is affixed thereto. A recipient receiving goods having the associated label can read or scan the label and verify that the goods and information related to the goods on the label is accurate by comparing the code. The recipient scans the associated information to derive the code, and compares the code with the code included on the label to determine whether the codes match.

Another embodiment of the invention provides a method for generating scanable code based on an image. The method includes distilling an image based on hue components of the image. The image is distilled, or converted or reduced by setting a high-contrast on the image, such that the pixels of the image are reduced to all black, all white or all gray. A grid is superimposed over the resulting black and white, or black, white and gray image, providing squares which make a pattern. Each possible pattern is associated with a character. Guard bars are placed at a start and end point on the pattern, which indicates to a scanner which sections of the pattern to read. A recipient can scan the image and obtain the data provided in the patterns.

Yet another embodiment of the invention provides a method for generating scanable code based on an image. The method includes distilling an image based on hue components of the image, overlaying a grid over the distilled image to create a pattern, inserting guard bars to indicate a start and end point on the pattern, as described herein. Each pattern has a corresponding character obtained in a look-up table which can be used to generate a corresponding code. A scanner can read the code and reference the look-up table to obtain the corresponding character.

Another embodiment of the invention provides a method for identifying a good including encoding barcode information in a digital format and storing the digital barcode into an RFID tag. The barcode information can be obtained to identify a good using an RFID scanner, or other reader. Another embodiment of the invention provides authentication of the good, and includes obtaining a code, such as a checksum, based on information related to the good, and storing the code on the RFID tag. The RFID scanner or other reader can identify the good and/or simultaneously authenticate the good by verifying that the code or checksum matches the information.

According to another embodiment of the present invention, a method of facilitating the authentication of items is provided. The method comprises obtaining a code based on an image, and associating the image and a machine-readable symbol comprising the code with one or more items to be authenticated.

According to another embodiment of the present invention, the machine-readable symbol is a bar code such as a Reduced Space Symbology (RSS) bar code.

According to another embodiment of the present invention, the image is a photograph, and/or textual information.

According to another embodiment of the present invention, a method of authenticating items is provided. The method comprises obtaining a first code based on an image associated with one or more items. A second code is obtained based on a machine-readable symbol also associated with the one or more items. The authenticity of the one or more items is determined based on the first and second codes, wherein determining the authenticity of the one or more items comprises determining whether the first code matches the second code.

According to another embodiment of the present invention, a symbol is provided for facilitating the authentication of one or more items. The symbol comprises an image associated with the one or more items. A machine-readable symbol is associated with the one or more items, whereby the machine-readable symbol includes a code that is based on the image.

According to another embodiment of the present invention, the image comprises a first and a second guard bar for reading the first code associated with the image.

According to another embodiment of the present invention, the image comprises a photograph, a portrait, textual information.

According to another embodiment of the present invention, the machine-readable symbol comprises a Reduced Space Symbology (RSS) bar code.

According to another embodiment of the present invention, the machine-readable symbol comprises data associated shipping information, inventory information, invoice information, product type information, purchase order information, and/or signature information.

According to another embodiment of the present invention, the symbol further comprises a label including the machine-readable symbol and image formed thereon for application to the one or more items.

According to another embodiment of the present invention, a method of facilitating the authentication of items is provided, where the method comprises associating a machine-readable symbol with one or more items to be authenticated. A memory and a transceiver are also associated with the one or more items, whereby the memory is coupled to the transceiver. The memory stores an image of the machine-readable symbol.

According to another embodiment of the present invention, a method of authenticating items is provided. The method comprises obtaining a first code based on a first machine-readable symbol associated with one or more items. An image of a second machine readable-symbol is processed and stored in a memory to obtain a second code. The memory is coupled to a transceiver and both are associated with the one or more items. The authenticity of the one or more items is determined based on the first and second codes.

According to another embodiment of the present invention, determining the authenticity of the one or more items comprises determining whether the first code matches the second code.

According to another embodiment of the present invention, a method of facilitating the authentication of items is provided. The method comprises associating a machine-readable symbol and an image with one or more items to be authenticated. A memory and a transceiver are also associated with the one or more items, where the memory is coupled to the transceiver. The memory stores the machine-readable symbol and the image.

According to another embodiment of the present invention, the machine-readable symbol comprises machine-readable data.

According to another embodiment of the present invention, the machine-readable symbol comprises a machine-readable symbol image.

According to another embodiment of the present invention, the transceiver transmits the stored machine-readable symbol and image to a receiver for authentication.

According to another embodiment of the present invention, a method of authenticating items is provided. The method comprises processing a machine-readable symbol stored in a memory to obtain a first code, whereby the memory is coupled to a transceiver. The memory and transceiver are associated with the one or more items. An image stored in the memory is processed in order to obtain a second code. The authenticity of the one or more items is determined based on the first and second codes, whereby the authenticity of the one or more items is determined by whether the first code matches the second code.

According to another embodiment of the present invention, obtaining the first code comprises reading the machine-readable symbol.

According to another embodiment of the present invention, a method of facilitating the authentication of items is provided. The method comprises obtaining a code based on an image that comprises a plurality of regions, whereby the code is related to at least one of the plurality of regions. The image and a machine-readable symbol comprising the code are associated with one or more items to be authenticated.

According to another embodiment of the present invention, the code comprises a checksum.

According to another embodiment of the present invention, the code comprises encoding one or more pixels associated with the plurality of regions.

According to another embodiment of the present invention, a method of authenticating items is provided. The method comprises obtaining a first code based on an image associated with one or more items, where the image comprises a plurality of regions and the first code is related to at least one of the plurality of regions. A second code is obtained based on a machine-readable symbol associated with the one or more items. The authenticity of the one or more items is determined based on the first and second codes.

According to another embodiment of the present invention, determining the authenticity of the one or more items comprises determining whether the first code matches the second code.

According to another embodiment of the present invention, a method of obtaining data from an image is provided. The method comprises processing color characteristics of one or more pixels of a first image to obtain a second image. The second image is interpreted as a machine-readable symbol to thereby obtain a code from the second image.

According to another embodiment of the present invention, interpreting the second image as a machine-readable symbol comprises interpreting the second image as a bar code.

According to another embodiment of the present invention, interpreting the second image as a bar code comprises interpreting the second image as a bar code according to a bar code format comprising a plurality of patterns and corresponding values where each of the plurality of patterns of the bar code format has a corresponding value.

According to another embodiment of the present invention, interpreting the second image as a bar code comprises interpreting the second image as at least part of a two-dimensional bar code.

According to another embodiment of the present invention, a method of facilitating the authentication of items is provided. The method comprises obtaining a machine-readable symbol based on an image by processing color characteristics of one or more pixels of the image. The image and the machine-readable symbol are associated with one or more items to be authenticated.

According to another embodiment of the present invention, obtaining a machine-readable symbol based on an image comprises obtaining a bar code based on an image.

According to another embodiment of the present invention, obtaining a bar code based on an image comprises obtaining at least part of a two-dimensional bar code from an image.

According to another embodiment of the present invention, the method further comprises generating a second bar code encoding data related to the two-dimensional bar code. Associating the image and the machine-readable symbol with one or more items to be authenticated comprises associating the two-dimensional bar code and the second bar code with the one or more items so that the two-dimensional bar code and the second bar code form a composite bar code.

According to another embodiment of the present invention, a method of authenticating of items is provided. The method comprises obtaining a first machine readable symbol based on an image associated with one or more items by processing color characteristics of one or more pixels of the image. The authenticity of the one or more items is determined based on the first machine-readable symbol and a second machine-readable symbol associated with the one or more items. Determining the authenticity of the one or more items comprises obtaining a first code from the first machine-readable symbol, obtaining a second code from the second machine-readable symbol, and determining the authenticity of the one or more items based on the first and second codes.

According to another embodiment of the present invention, obtaining the first machine-readable symbol based on the image comprises obtaining a first bar code based on the image. The second machine-readable symbol comprises a second bar code.

According to another embodiment of the present invention, obtaining the first bar code based on the image comprises obtaining a two-dimensional bar code from the image, where the two dimensional bar code and the second bar code form a composite bar code. Determining the authenticity of the one or more items comprises determining whether the second bar code corresponds to the two dimensional bar code.

According to another embodiment of the present invention, a method of facilitating the authentication of items is provided. The method comprises obtaining a machine-readable symbol based on an image by processing color characteristics of one or more pixels of the image. A code is obtained based on the machine-readable symbol, where the code is stored in a memory device coupled to a transceiver device. The image, the memory device, and the transceiver device are associated with one or more items to be authenticated.

According to another embodiment of the present invention is provided, a method of authenticating items is provided. The method comprises obtaining a machine readable symbol based on an image associated with one or more items by processing color characteristics of one or more pixels of the image. A first code is obtained based on the machine-readable symbol. A second code is obtained from a memory device associated with the one or more items, where the memory device is coupled to a transceiver device associated with the one or more items. The authenticity of the one or more items is determined based on the first and second codes.

According to another embodiment of the present invention, determining the authenticity of the one or more items comprises determining whether the first code matches the second code.

According to another embodiment of the present invention, a method of facilitating the authentication of items is provided. The method comprises obtaining a machine-readable symbol based on a first image by processing color characteristics of one or more pixels of the first image. Am image of the machine-readable symbol stored in a memory device coupled to a transceiver device. The image of the machine-readable symbol, the memory device, and the transceiver device are associated with one or more items to be authenticated.

According to another embodiment of the present invention, a method of authenticating items is provided. The method comprises obtaining a first machine-readable symbol based on an image associated with one or more items by processing color characteristics of one or more pixels of the image. A second machine-readable symbol is obtained from a memory device associated with the one or more items, where the memory device is coupled to a transceiver device associated with the one or more items. The authenticity of the one or more items is determined based on the first and second machine-readable symbols.

According to another embodiment of the present invention, determining the authenticity of the one or more items comprises: obtaining a first code from the first machine readable symbol; obtaining a second code from the second machine-readable symbol; and determining the authenticity of the one or more items based on the first and second codes.

According to another embodiment of the present invention, a method of generating scanable code based on an image is provided. The method comprises processing color characteristics of one or more pixels associated with the image. A first code is obtained for the one or more pixels, where the first code corresponds to a second code associated with a machine-readable symbol.

According to another embodiment of the present invention, the second code is generated by applying the first code to a look-up table associated with the machine-readable symbol.

According to another embodiment of the present invention, the method further comprises adding a first indicator symbol for indicating a starting point for scanning the image, and adding a second indicator symbol for indicating an end point for scanning the image.

According to another embodiment of the present invention, the method further comprises applying the generated scanable code to the one or more items.

According to another embodiment of the present invention, processing the color characteristics of the one or more pixels comprises varying the hue values of the one or more pixels such that hue values comprising more than 50% gray black are converted to hue values representing black, and the hue values comprising more less than 50% gray white are converted to hue values representing white.

According to another embodiment of the present invention, the one or more pixels converted to hue values representing black are encoded as a first code value and the one or more pixels converted to hue values representing white are encoded as a second code value.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Preferred embodiments of the invention are now described with reference to the drawings. In general, a shipment of goods is sent from a place of origin to its destination with accompanying paperwork and other information. Typically, a limited amount of information is incorporated into a barcode label placed on the goods, and other information is included in an attached packing slip. Some of the types of information relating to goods includes: product type, origin and destination address, or other information such as identification numbers for an invoice, purchase order, shipment or lot number, date, shipment storage, use and tracking information.

Figure 1:
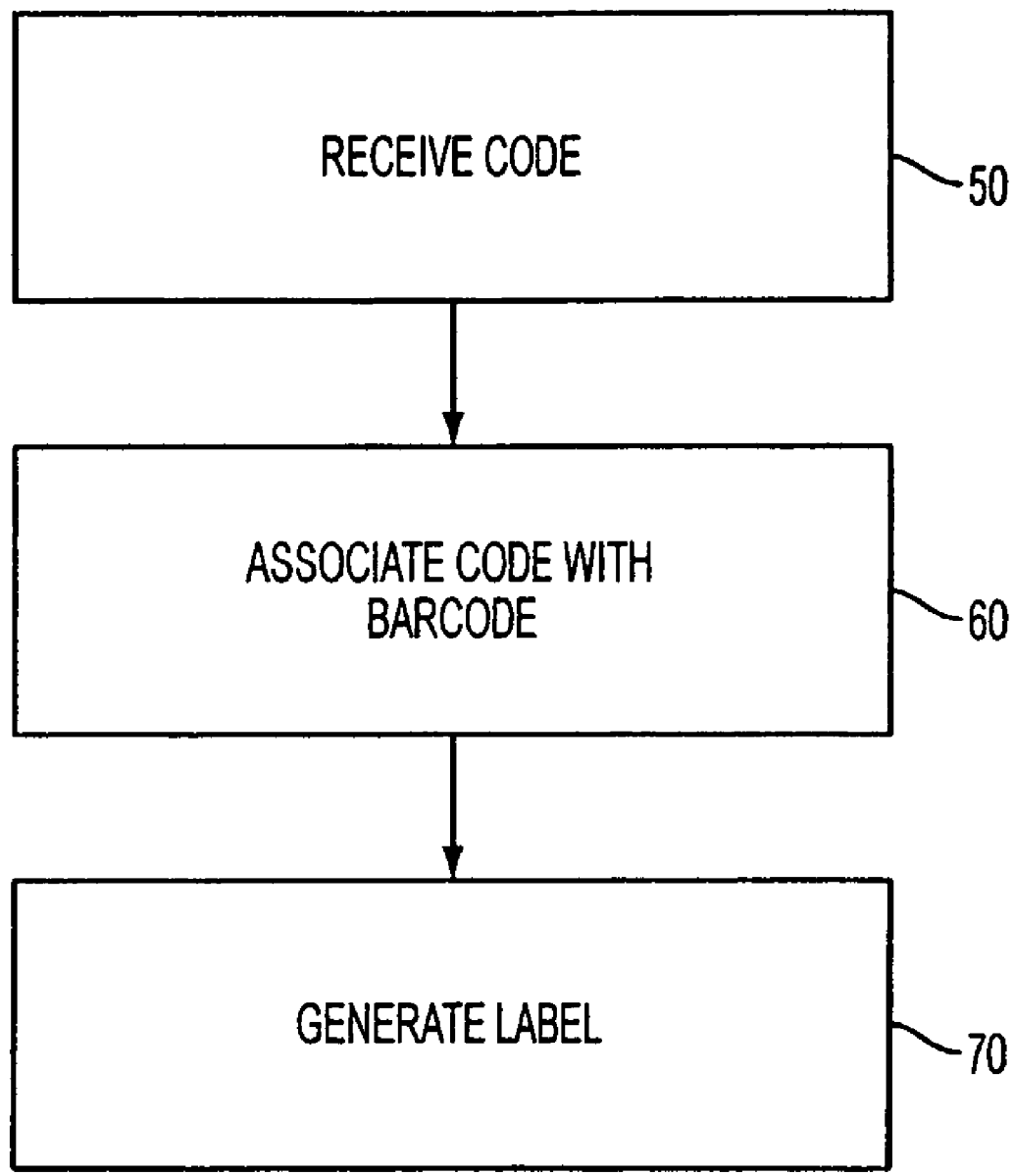
FIG. 1 depicts a flowchart of a method according to an embodiment of the invention.
Figure 2:
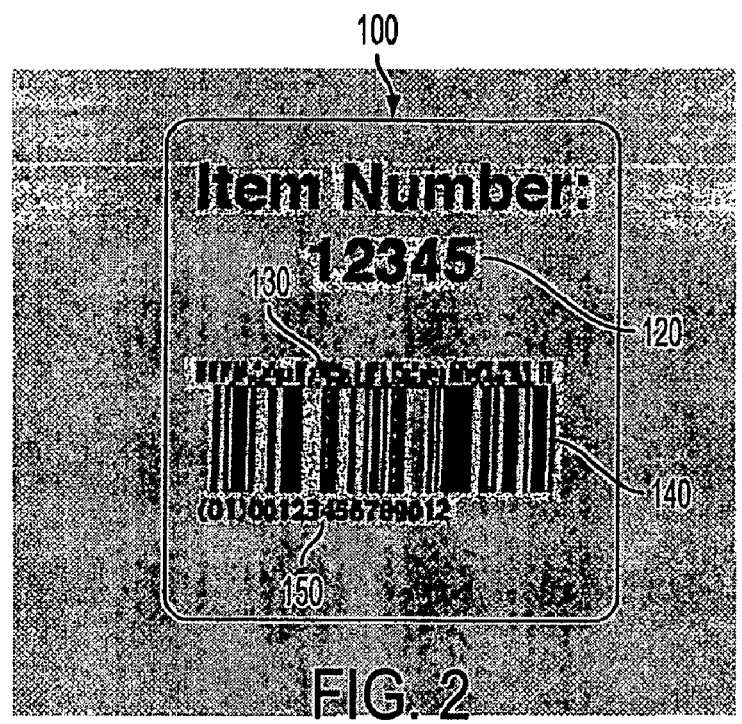
FIG. 2 depicts a label according to an embodiment of the invention.
Figure 3:
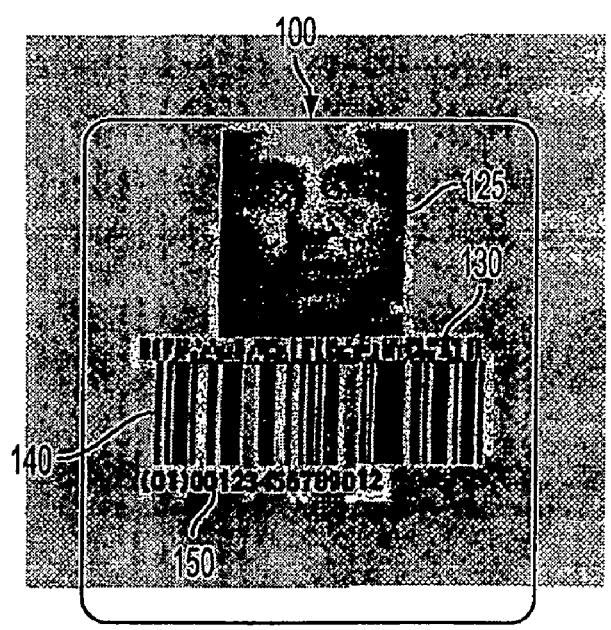
FIG. 3 depicts a label according to an embodiment of the invention.

Referring to FIG. 1 which depicts a method for authenticating goods according to an embodiment of the invention. A code is received, step 50. The code is derived from associated information which may be related to the good, as described herein, such as the item number 120 or associated image 125 shown in FIGS. 2 and 3. FIGS. 2 and 3 depict a label 100 according to an embodiment of the invention. Other associated information may be information related to shipping, tracking, inventory, orders, invoices, tariffs, photographs, fingerprints, product type, regulations, passport, legal documents, building pass, barcodes or other information in text, image or other digital format.

It is understood that the item number 120 or associated image 125 as shown on the label 100 may be an alphanumeric combination, image or other identifier readable by humans, and/or identifier readable by a scanner or reader. In preferred embodiments, the code is based on all of the information associated with the goods that is printed on a label or otherwise accompanies the good, or a portion of the information associated with the goods. For example, when a code is derived from a signature or fingerprint, any or all portions of the signature or image may be used. When the code is derived from an image, such as a portrait, all of the image may be used to derive the code, or detail rich portions, such as the eyes, may be used to derive the code. The code may be a checksum, sum of all known points, or other code representing information placed on a label. The checksum or code may be obtained by methods known in the art, such as checksum algorithms, hash algorithms, multipliers or other methods for obtaining codes representing information.

The code is associated with a barcode, step 60. The code is associated with a barcode, for example, by converting the code into barcode format, as shown on the goods label 100 of FIGS. 2 and 3. Types of barcodes depicted on FIGS. 2 and 3 include two-dimensional composite code 130 shown in Micro PDF417 format and RSS linear barcode 140. Additionally, the code may be associated with a barcode in human readable form 150, which provides the data indicated in the barcode in a human readable format. A label is created including the code and associated barcode, step 70 and associated with the good, e.g. by affixing the label to the good. In preferred embodiments, the label includes the data depicted on label 100 of FIGS. 2 and 3, including the information related to the good and the code associated with the information related to the good in barcode format.

A recipient of goods bearing label 100 authenticates the goods by scanning or reading the associated information on the label to derive the code, scanning the barcode including the code, and comparing the codes to authenticate the goods. Matching codes indicate that the label is unaltered. A mismatched code would indicate that the label had been altered. In preferred embodiments, the scanner or reader would provide a signal in the event of a mismatched code, for example, an audible beep.

Figure 4:
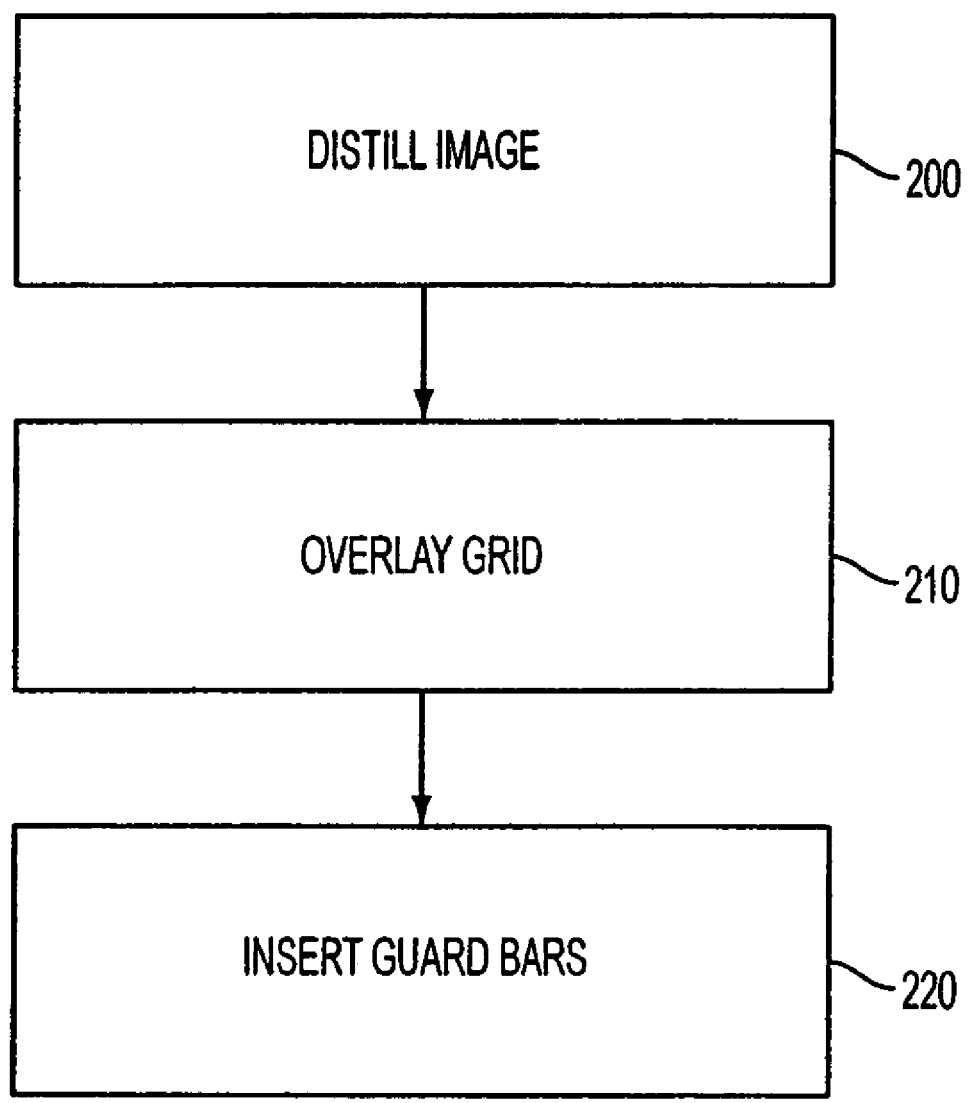
FIG. 4 depicts a flowchart of a method according to an embodiment of the invention.

Referring to FIG. 4, which depicts a method for generating a barcode according to an embodiment of the invention, an image is distilled, step 200, based on hue components of the image by, for example, a scanner programmed to perform this distillation or a computer that receives the image (e.g., from a scanner) and is programmed to perform this distillation. The distilled image may be retained in the memory of a scanner or a computer for further processing, as described below.

Figure 5:
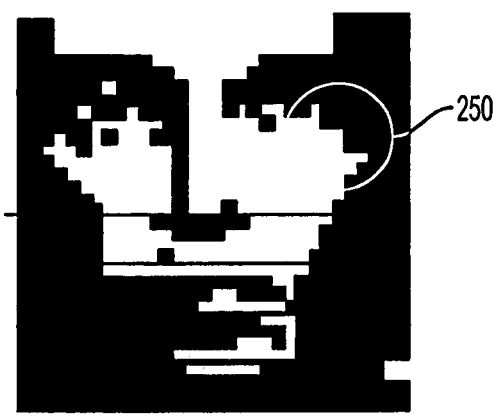
FIG. 5 depicts a converted image according to an embodiment of the invention.
Figure 6A:
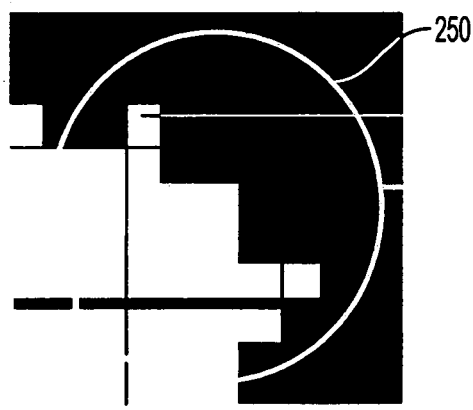
FIG. 6A depicts a blown up view of a section of the image of FIG. 5 according to an embodiment of the invention.
Figure 6B:
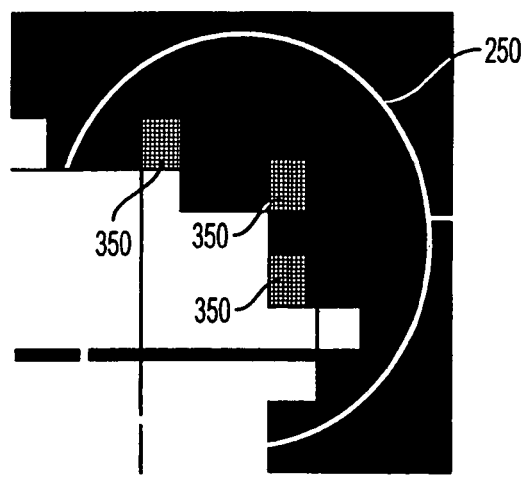
FIG. 6B depicts a blown up view of a section of the image of FIG. 5 according to an embodiment of the invention.

For example, an image is converted using a high contrast setting to obtain a black and white image, or a black white and gray image based on color or hue ratios contained in the image. More specifically, areas having color or hue values of more than 50% gray black become black and areas having color or hue values below 50% gray white are white. In another embodiment, areas having color or hue values of more than 33.3% gray black become black, areas having color or hue values below 33.3% gray white are white, and areas having color or hue values below 33.3% gray black and above 33.3% gray white are gray. An example of a converted image is depicted in FIGS. 5, 6A and 6B. FIG. 5 is a converted image of the associated image 125 of FIG. 3 such that the image of FIG. 5 contains only black and white pixels, and not the grayscale of the associated image 125 as shown in FIG. 3. A portion 250 of FIG. 5 is shown in a blown up view in FIGS. 6A and 6B.

In preferred embodiments, the portion 250 shown in FIG. 6B contains key predefined pixels. Key predefined pixels are elements of an image which are selected as representative elements of the image to be scanned. For example, detail-rich areas of the image, such as the eyes on a portrait, are pre-selected to be scanable by the scanner. Although it is preferable to convert an entire image into a scanable image, the resulting data may overwhelm conventional scanners. To limit the volume of data associated with a scanable image, key predefined pixels are provided. As shown in FIG. 6B, there are three key predefined pixels. It is understood that there can be greater than three key predefined pixels. Information related to identifying the key predefined pixels can be communicated to a recipient, or otherwise indicated on the label or other documentation.

Figure 7:
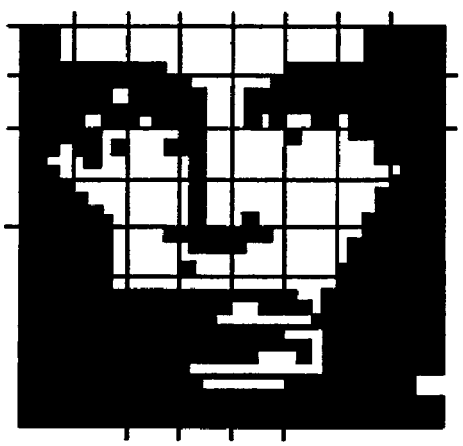
FIG. 7 depicts a converted image and superimposed grid according to an embodiment of the invention.

A grid may be laid over the converted image of FIG. 5, step 210. In preferred embodiments, the grid is at least 32×32 as shown in FIG. 7. It is understood that the grid can be in the range of 6×6 to 1000×1000 to provide pattern variations sufficient to differentiate various images. In the example of FIG. 7, an image, using a 32×32 grid, can be depicted as a string of zeroes and ones or other alphanumeric characters to represent the image. Each square of the grid would represent a value based on the associated image (for example black equals one, white equals zero). A select number of points on the grid would be scanned and their values used to construct a derivative that could be embedded in the bar code. For example, the first row has a pattern of a certain number of black squares, followed by several white squares followed by further black squares. This could be represented, for example, as "11111000000000000111." Each pattern variation refers to a character.

Guard bars or other start and end point indicators may be inserted, step 220, to offset the alphanumeric characters so that barcode readers or scanners can identify a start and end point. Guard bars 300 are shown at each side of the barcodes of FIGS. 8, 9 and 10A. The resulting converted image, overlaid grid and guard bars may be printed on a label where they would be readable by a scanner or reader. Also, as mentioned above, the processing above could be performed in scanner or computer memory such that the resulting converted image, residing in scanner or computer memory, could be interpreted as a bar code, e.g., by software that interprets images of patterns as bar code.

Figure 8:
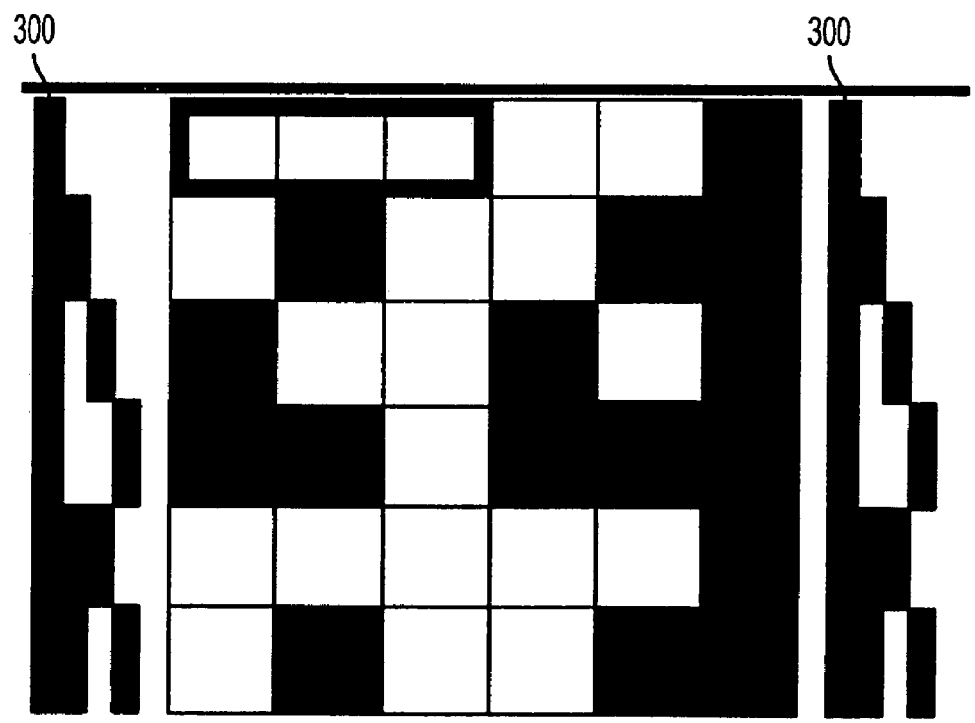
FIG. 8 depicts a label according to an embodiment of the invention.
Figure 9:
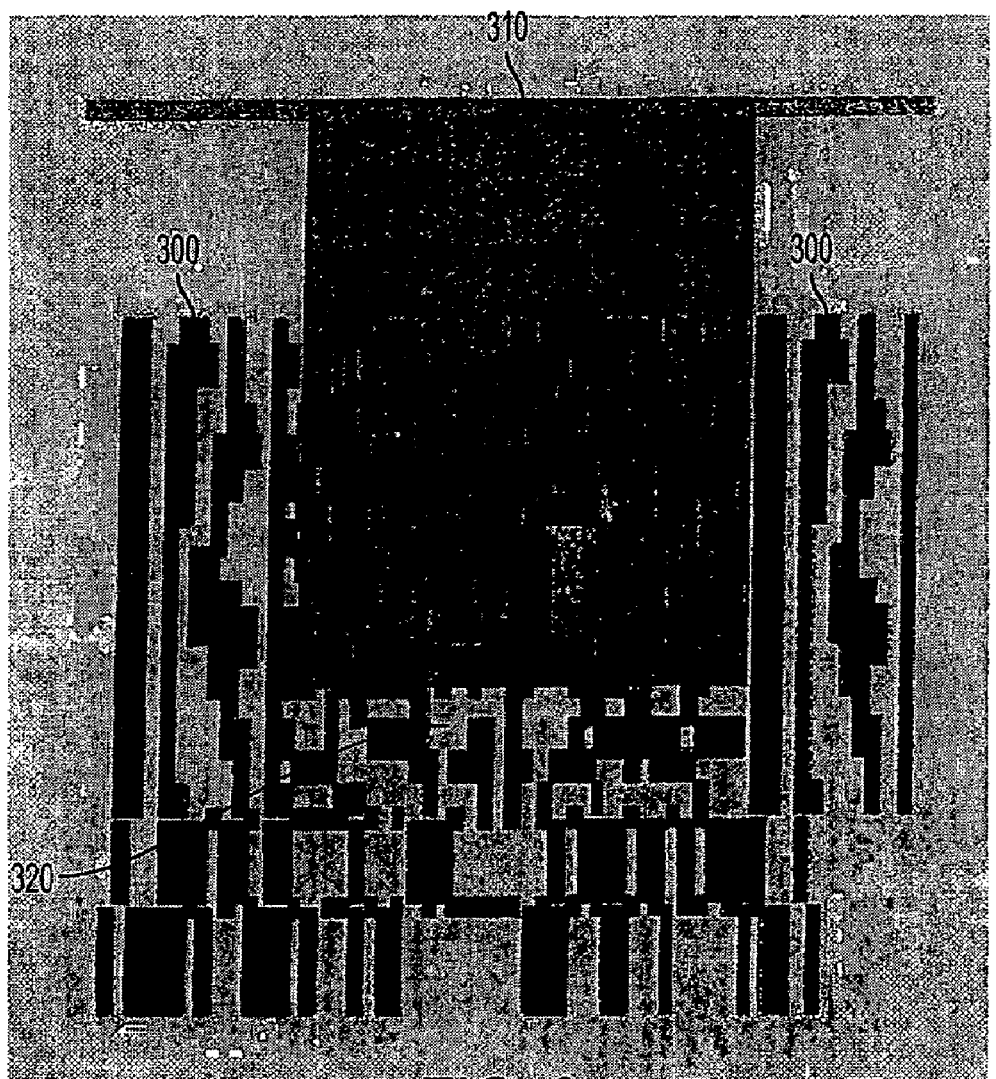
FIG. 9 depicts a label according to an embodiment of the invention.
Figure 10A:
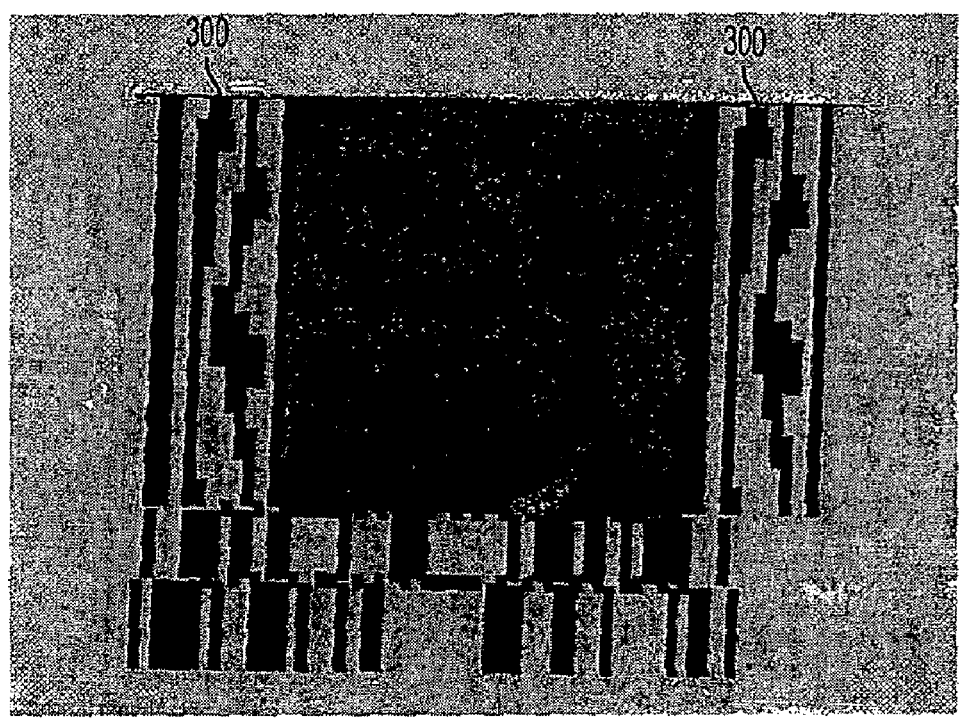
FIG. 10A depicts a label according to an embodiment of the invention.

An example of the image and guard bars is shown in FIGS. 8, 9 and 10A. Referring to FIG. 8, the guard bars are buried within the digital image and in FIG. 10A, the guard bars of RSS are included in a stacked framing image. The converted image and guard bars may be included in a label, which is associated with a good, for example, by affixing the label to the good.

Figure 10B:
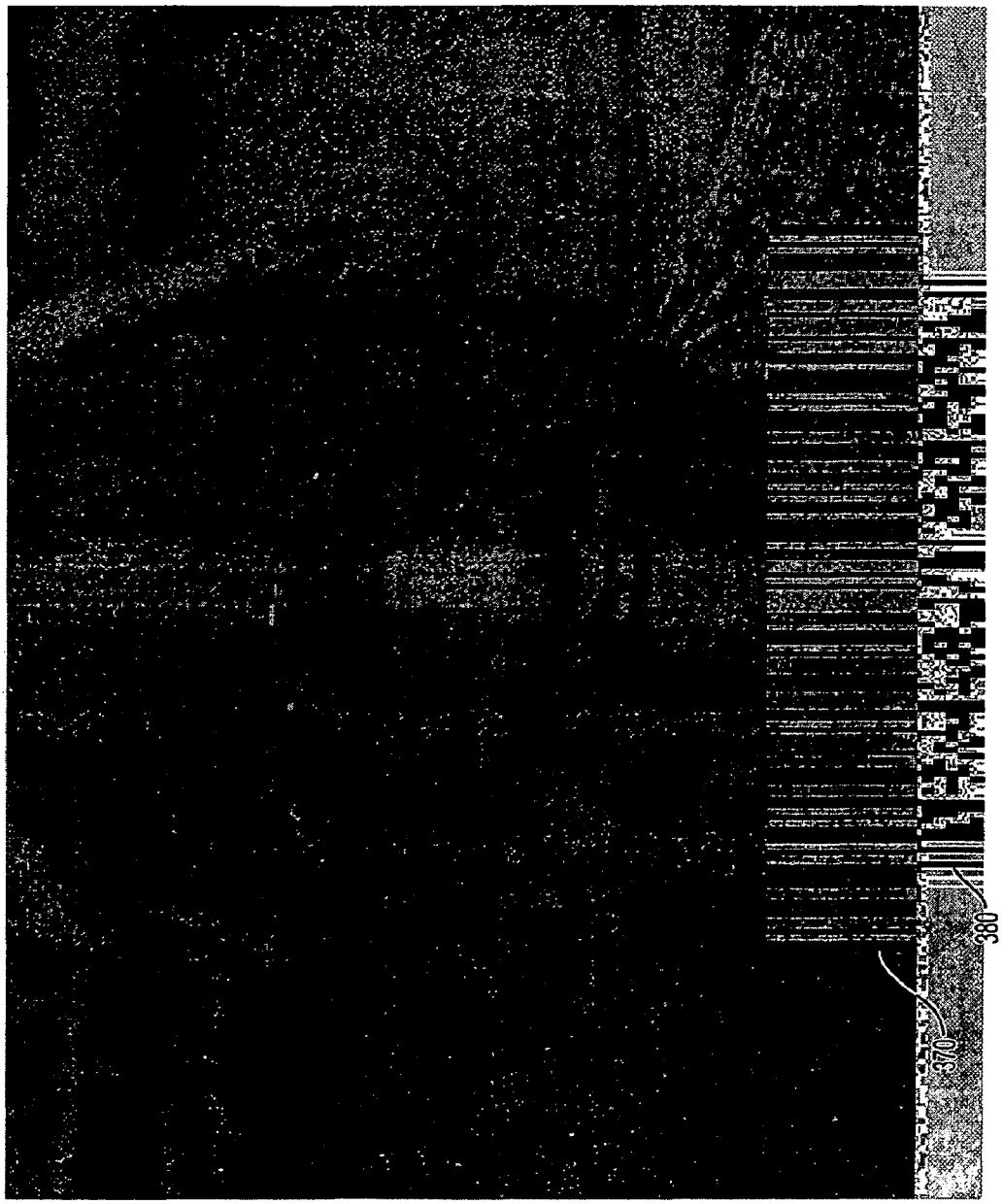
FIG. 10B depicts a label according to an embodiment of the invention.

Referring to FIG. 10A, which depicts guard bars of RSS stacked framing portrait, an image is converted into its black and white components, a grid is overlaid and it can be read as patterns of bar code in the two-dimensional composite portion of a bar code. As mentioned above, this conversion and interpretation of the image as a bar code may be performed by a scanner or computer programmed to do so while the image resides in the memory of the scanner or computer, respectively. It is understood that the resulting barcode pattern can be any conventional barcode or the barcode of FIG. 10B which includes a linear barcode containing color variations based on the underlying image 370 and RSS barcode 380. The linear barcode 370 is readable by conventional barcode scanners because of the contrast between the light and dark bars. Additionally, scanners specially programmed to read the color gradations within the barcode lines can read additional information contained therein. The image is provided in a machine-readable format to allow for scanner to automate the authentication process.

A recipient receiving the good scans the label, more specifically, the patterns on the label between the guard bars and obtains the characters corresponding to each pattern.

Although the invention is described with reference to black and white patterns, or black, gray and white patterns, it is understood that the same method may be applied to color images, which would yield a greater number of patterns, therefore, a greater number characteristics can be assigned to each pattern.

In another embodiment of the invention, the scanable image generated based on the image according to the flow diagram of FIG. 4 is used together with the authentication method of FIG. 1 to provide the information related to a good from which a code is derived, such as a checksum or other data verification item. The checksum can be obtained based on data contained in the entire image, or derived from the key predefined pixels described herein.

Referring again to FIG. 9, a scanner reads the image between the guard bars 300. As described herein, the guard bars 300 provide a start and end point for a scanner or reader. Within the image 310 is RSS barcode 320. RSS is a complicated barcode containing narrow and wide bars and narrow and wide spaces. There are many combinations of patterns in RSS, more so than the number of characters generally sought to be represented by RSS code. At the other end of the spectrum of capacity to represent characters in codes, is Code 39 which represents characters 0 through 9, A through Z and several symbols.

It should be noted that FIGS. 9 and 10A may depict different stages of processing. FIG. 10A may depict an image framed by guard bars and a stacked linear bar code that may be printed on a label. FIG. 9 may depict a bar code 320 that resides in the memory of a scanner or computer that processes the image of FIG. 10A. For example, the image of FIG. 10A is scanned and while the scanned image resides in scanner or computer memory, it may be processed, as described above, so as to convert it to bar code 320.

Another embodiment of the invention includes generating a barcode based on patterns associated with an image, as described herein, according to a look-up table. Each possible pattern variation created by converting an image into its black and white, or black, white and gray components and overlaying a grid over the image can be associated with a character. In a preferred embodiment, the number of possible patterns is reduced, for example, by referring to a specified number of squares to obtain a single pattern which corresponds to a character. A scanner reads the converted image, or the converted image residing in scanner or computer memory is analyzed, and based on the patterns contained in the image, look ups may be performed to find the associated codes in a table. The present invention provides a barcode providing a reasonable number of characters, or a reduced set of characters, in an alphanumeric set based on correlating patterns obtained by converting an image to codes in a look-up table. A preferred number of characters are $2^5$, or 32, representing A through Z and 0 through 5. The image is reduced to a short string of alphanumeric characters to allow easy comparison of two scans of two digital images.

For example, where $2^5$, or 32 characters are used in the creation of a bar code, the image should comprise encoded regions each having the same number of possible code variations than that of the corresponding bar code characters (i.e., 32) associated with the bar code. Therefore, for each code associated with an encoded region of the image, based on the lookup table, there will be a corresponding bar code character (e.g., 0-5 and A-Z). For example, a truncated RSS-14 bar code may be associated with an image that has been divided into a grid (e.g., 7×2) having no more than 14 encoded regions. The encoded region is applied to a lookup table that in turn generates the corresponding bar code character. Moreover, each encoded region represents the character of the bar code. If, for example, 32 characters are used in the bar code generation, each encoded region must have a 5-bit code word (e.g., "11110") to represent the 32 entries in the lookup table. For example, each pixel having a black color may be assigned a code bit of "1." Similarly, each pixel having a white color may be assigned to code bit "0." Thus, each group of five pixels may represent a character of the bar code in the given example.

Referring again to FIG. 6B, the image can be converted into a barcode using an image with a superimposed grid of a predefined number of squares. Each square of the grid represents a value based on the associated image (for example black equals one, white equals zero). In some embodiments, every element of the image is used in the conversion to a barcode. It is preferable to convert the entire image into machine-readable alphanumeric strings, however, the resulting data may overwhelm a conventional scanner. To limit the volume of data associated with an image, in other embodiments, a select number of points, or predefined pixels, on the grid, such as the three key predefined pixels 350 are scanned and their values used to construct a code based on a look up table. It is understood that there can be more than three key predefined pixels. The key predefined pixels may be obtained via communication between the sender and recipient, or other means.

Figure 11:
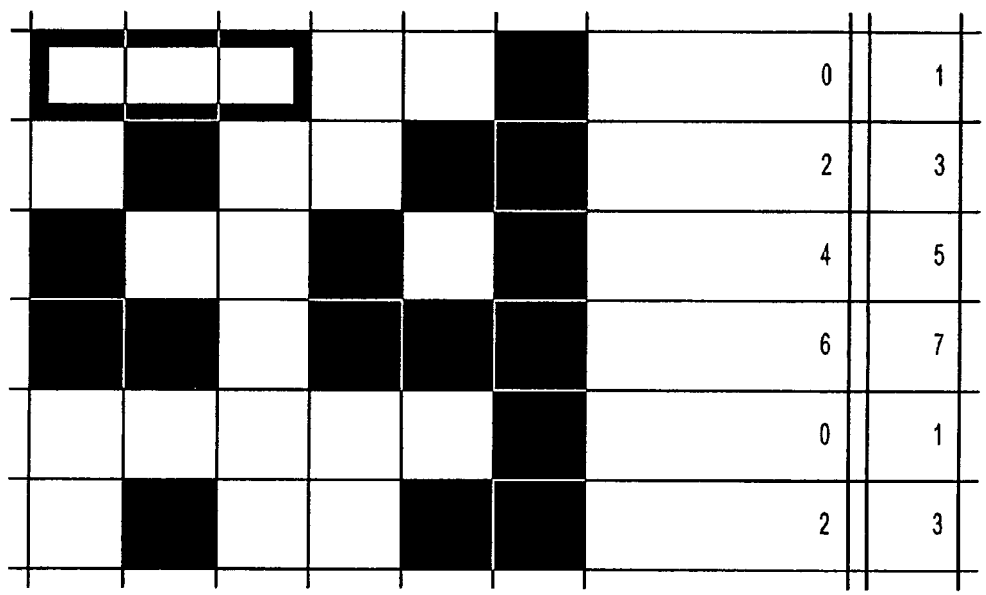
FIG. 11 depicts a grid with pixel sprites according to an embodiment of the invention.

Referring to FIG. 11, the image of FIGS. 5, 6A and 6B is divided into a 6×6 grid and each three-pixel sprite is given a value from 0 to 7. The bar code scanner is programmed to read a two dimensional bar code where each row is equal to the height of a single sprite. FIG. 11 includes six tiers of bar coded information. The image on the label would have an additional guard bar image that would help the scanner to define the tiers, start and end points, such as the guard bars shown in FIG. 8 on either side of the grid.

A recipient receiving the goods having the associate label can read or scan the code and refer to the look up table to obtain the characters referenced in the code.

Two technologies, RFID and bar code, can have a synergistic effect when brought together and applied to tracking, securing and authenticating commercial items. RFID technology includes the use of RFID tags and readers. RFID tags generally include data storage, for example, a chip. Some RFID tags additionally include transceivers to communicate data stored on the tag. The data storage in RFID tags typically contains information related to the item on which the RFID tag is placed. Communication of data between RFID tags and a reader or scanner is typically by wireless communication.

Figure 12:
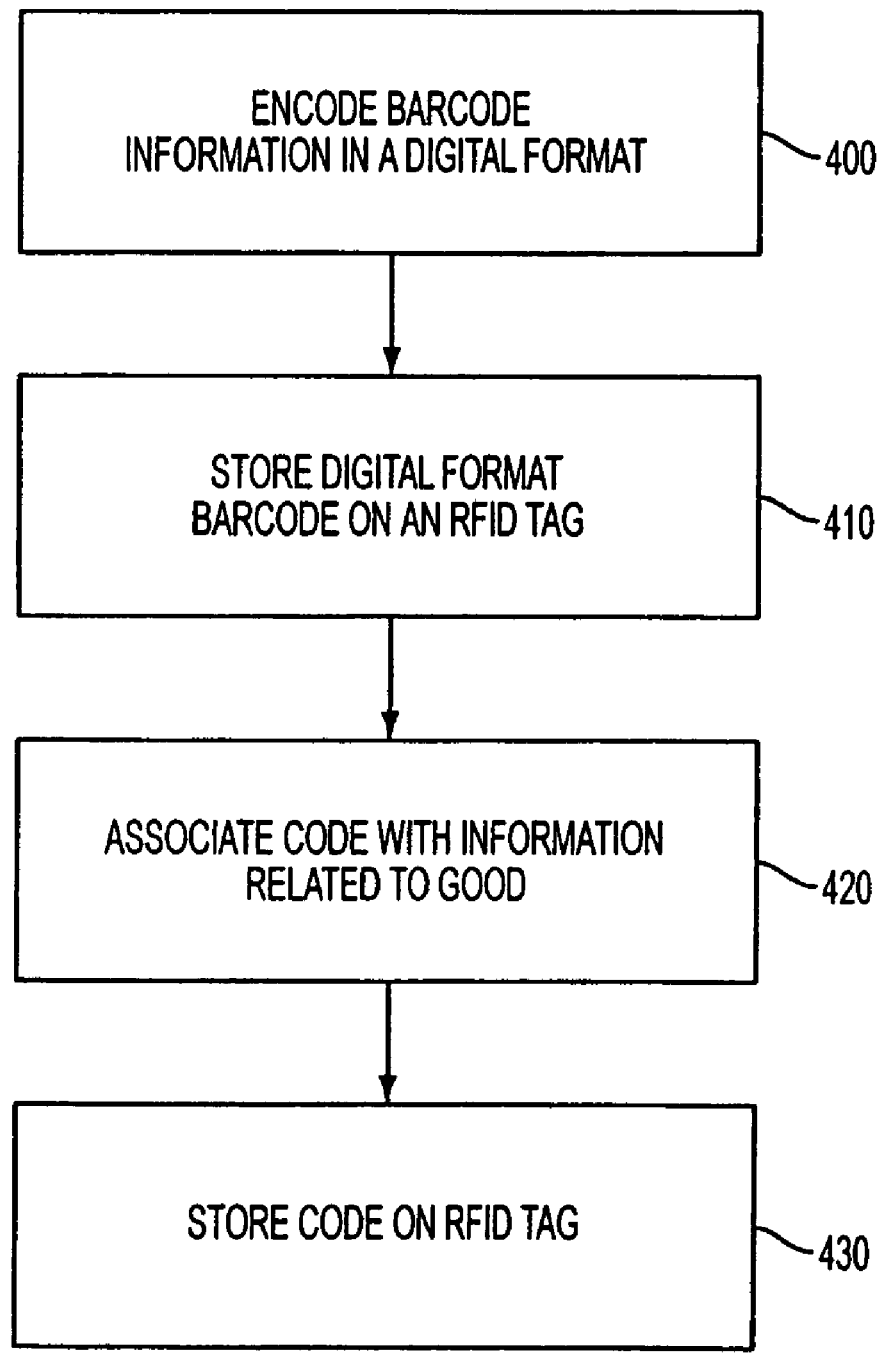
FIG. 12 is a flowchart of a method according to an embodiment of the invention.

Referring to FIG. 12, which depicts a flowchart of a method according to an embodiment of the invention, barcode information is encoded into a digital format, step 400. The barcode information can be information in a conventional barcode format, or barcode information generated, as described herein based on an image. The barcode information can be obtained for example, from a label on a good or from a database, such as an inventory of goods. The barcode information is encoded into a digital format, for example, by reducing the barcode to a series of zero's and one's, or other digital format. The digital barcode information is stored on an RFID tag, step 410. The digital barcode information can then be read by an RFID scanner. The RFID scanner reproduces the digital barcode information into a barcode, or communicates the data to a barcode based network or system. The goods or information related to the goods can be identified and obtained from the tag.

In preferred embodiments, a code derived from information associated with the goods, as described herein is received or otherwise obtained, for example, as a checksum or other verifier, step 420. This code is substantially the same as the code described in reference to FIG. 1. The code is stored to the RFID tag, step 430. The resulting tag contains RFID data, digital barcode data and an authenticating code, such as a check sum. When the tag is read, the RFID data, digital barcode and authenticating code are compared to verify that the tag is authentic and none of the information was altered.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method of facilitating the authentication of items, comprising:
    obtaining a code based on an image; and
    associating the image and a machine-readable symbol comprising the code with one or more items to be authenticated, wherein the machine-readable symbol comprises data associated with at least one of the group consisting of shipping information, inventory information, invoice information, product type information, purchase order information, and signature information.

2. The method according to claim 1, wherein the machine-readable symbol is a bar code.

3. The method according to claim 1, wherein the image is a photograph.

4. The method according to claim 1, wherein the image comprises textual information.

5. The method according to claim 1, wherein the machine-readable symbol comprises a Reduced Space Symbology (RSS) bar code.

6. A method of authenticating items, comprising:
    obtaining a first code based on an image associated with one or more items;
    obtaining a second code based on a machine-readable symbol associated with the one or more items, wherein the machine-readable symbol comprises data associated with at least one of the group consisting of shipping information, inventory information, invoice information, product type information, purchase order information, and signature information; and
    determining the authenticity of the one or more items based on the first and second codes.

7. The method according to claim 6, wherein determining the authenticity of the one or more items comprises determining whether the first code matches the second code.

8. A symbol for facilitating the authentication of one or more items, the symbol comprising:
- an image associated with the one or more items; and
- a machine-readable symbol associated with the one or more items, wherein the machine-readable symbol comprises a code that is based on the image, and wherein the machine-readable symbol comprises data associated with at least one of the group consisting of shipping information, inventory information, invoice information, product type information, purchase order information, and signature information.

9. The symbol according to claim 8, wherein the image comprises a first and a second guard bar for reading the first code associated with the image.

10. The symbol according to claim 8 wherein the image comprises a photograph.

11. The symbol according to claim 8, wherein the image comprises a portrait.

12. The symbol according to claim 8, wherein the image comprises textual information.

13. The symbol according to claim 8, wherein the machine-readable symbol comprises a Reduced Space Symbology (RSS) bar code.

14. The symbol according to claim 8, further comprising a label including the machine-readable symbol and image formed thereon for application to the one or more items.

15. A method of facilitating the authentication of items, comprising:
- obtaining a code based on an image that comprises a plurality of regions, wherein the code is related to at least one of the plurality of regions; and
- associating the image and a machine-readable symbol comprising the code with one or more items to be authenticated, wherein the machine-readable symbol comprises data associated with at least one of the group consisting of shipping information, inventory information, invoice information, product type information, purchase order information, and signature information.

16. The method according to claim 15, wherein the code comprises a checksum.

17. The method according to claim 15, wherein the code comprises encoding one or more pixels associated with the plurality of regions.

18. A method of authenticating items, comprising:
- obtaining a first code based on an image associated with one or more items, wherein the image comprises a plurality of regions and the first code is related to at least one of the plurality of regions;
- obtaining a second code based on a machine-readable symbol associated with the one or more items, wherein the machine-readable symbol comprises data associated with at least one of the group consisting of shipping information, inventory information, invoice information, product type information, purchase order information, and signature information; and
- determining the authenticity of the one or more items based on the first and second codes.

19. The method according to claim 18, wherein determining the authenticity of the one or more items comprises determining whether the first code matches the second code.

* * * * *